United States Patent [19]

Müller et al.

[11] 4,074,133

[45] Feb. 14, 1978

[54] IONOGRAPHY IMAGING CHAMBER

[75] Inventors: Jürgen Müller; Alfred Rheude; Manfred Schmidt, all of Munich, Germany

[73] Assignee: AGFA-Gevaert, A.G., Leverkusen, Germany

[21] Appl. No.: 720,577

[22] Filed: Sept. 7, 1976

[30] Foreign Application Priority Data

Sept. 11, 1975 Germany .............................. 2540404

[51] Int. Cl.$^2$ ............................................. G03B 41/16
[52] U.S. Cl. ................................................ 250/315 A
[58] Field of Search ......................... 250/315 R, 315 A

[56] References Cited

U.S. PATENT DOCUMENTS 3,971,937 7/1976 Kenoshita .......................... 250/315 A Primary Examiner—Craig E. Church
Attorney, Agent, or Firm—Peter K. Kontler

[57] ABSTRACT

An ionography imaging chamber for use in X-ray systems wherein dielectric receptor sheets are introduced into an interelectrode gap of the imaging chamber and the gap is filled with compressed high Z gas during imaging of an object onto a sheet in the chamber so that the sheet is provided with a latent image of the object. The chamber has a gate defining an arcuate channel for introduction of receptor sheets into and evacuation of sheets from the interelectrode gap. In order to prevent escape of high Z gas into the atmosphere and/or penetration of air into the gap, the gate has one or more orifices for admission of a compressed buffer gas (for example, $CO_2$ gas) which is readily separable from the high Z gas whereby the buffer gas flows toward and away from the gap and mixes with high Z gas which tends to escape from the gap by way of the channel. The gate is further formed with one or more second orifices which evacuate the mixture of buffer gas and high Z gas from the channel between the first orifice or orifices and the gap. The gap is sealed from the inlet of the channel by one or more inflatable seals before the pressure of high Z gas in the gap is raised preparatory to exposure of a receptor sheet to X-rays.

14 Claims, 3 Drawing Figures

IONOGRAPHY IMAGING CHAMBER

BACKGROUND OF THE INVENTION

The present invention relates to improvements in X-ray apparatus having ionography imaging chambers of the type wherein a dielectric receptor sheet or an analogous insulating charge-receiving medium is placed into an interelectrode gas gap which is defined by two electrodes of the chamber and contains a compressed high Z gas, such as Krypton, Xenon or Freon.

Ionography imaging chambers are used in apparatus for making X-ray images without resorting to X-ray film. During imaging of an object, the interelectrode gap is filled with high Z gas. The electrodes which flank the receptor sheet in the interelectrode gap are connected with an energy source whereby the compressed gas absorbs X-rays to effect the generation of a charge by a quantum process, such as the photoelectric or Compton effect. The charge results in development of a latent electrostatic image at one side of the receptor sheet, and such latent image is made visible by an electrostatic technique including the deposition of toner particles. The chamber has a preferably slot-shaped aperture for introduction and withdrawal of receptor sheets.

In order to achieve a satisfactory yield, as well as to reduce the exposure of patients to X-rays, the high Z gas in the interelectrode gap is maintained at a superatmospheric pressure, normally at a pressure of 6–20 atmospheres. The pressure of high Z gas is reduced to atmospheric during introduction of a fresh receptor sheet into as well as during withdrawal of a receptor sheet from the interelectrode gap. To this end, the gap is connected with a reservoir and the gas is evacuated therefrom by resorting to a suitable pump or the like. However, even though the pressure of high Z gas in the interelectrode gap equals or closely approximates the pressure of surrounding air whenever a receptor sheet is advanced into or from the imaging chamber, the receptor sheets invariably entrain high Z gas from the imaging chamber during withdrawal of a sheet which carries a latent electrostatic image, and fresh receptor sheets invariably entrain some atmospheric air into the gap during introduction of such sheets into the imaging chamber. This entails losses in expensive high Z gas during withdrawal of sheets from the interelectrode gap and contamination of high Z gas in the gap during introduction of fresh receptor sheets. The likelihood of escape of relatively large quantities of high Z gas during withdrawal of receptor sheets and of admission of relatively large quantities of air into the imaging chamber during introduction of fresh receptor sheets is quite pronounced because the width of the aperture normally exceeds the thickness of a receptor sheet. This cannot be avoided because at least that side of a freshly exposed sheet which carries the latent image should not contact the adjacent surface or surfaces of the imaging chamber during withdrawal of such sheet from the interelectrode gap. Such dimensioning of the aperture insures that the latent image remains at least substantially intact during evacuation of the sheet from the gap.

In order to salvage at least those quantities of high Z gas which remain in the interelectrode gap but are contaminated by air, contaminated gas is withdrawn from the imaging chamber, separated from air, and reintroduced into the interelectrode gap. Such procedure is time-consuming and expensive because the separation of air from a noble gas normally involves liquefaction of air.

SUMMARY OF THE INVENTION

An object of the invention is to provide an ionography imaging chamber which can be operated with substantial savings in noble gas or other high Z gas.

Another object of the invention is to provide an imaging chamber wherein the contamination of high Z gas with air is prevented or reduced to a minimum by resorting to relatively simple, inexpensive and compact equipment.

A further object of the invention is to provide an imaging chamber with novel and improved means for admitting receptor sheets into and for removing receptor sheets from the interelectrode gap.

An additional object of the invention is to provide an X-ray apparatus which embodies an ionography imaging chamber with novel and improved means for simplifying and reducing the cost of purification of high Z gas which is admitted into the interelectrode gap of the imaging chamber and is maintained at an elevated pressure, at least during the generation of latent electrostatic images on receptor sheets.

Still another object of the invention is to provide an imaging chamber wherein the high Z gas cannot be contaminated by air in spite of the fact that the width of the aperture for introduction or withdrawal of receptor sheets may greatly exceed the thickness of such sheets.

The invention is embodied in an X-ray apparatus which comprises an ionography imaging chamber defining an interelectrode gap and having a preferably arcuate channel for introduction of preferably sheet-like insulating charge-receiving media into and withdrawal of such media from the interelectrode gap, a vessel or an analogous source of high Z gas (e.g., Xenon, Krypton or Freon), pumps or analogous means for conveying compressed high Z gas from the source into the interelectrode gap and vice versa, a reservoir or an analogous source of compressed buffer gas (e.g., $CO_2$ gas) which is readily separable from high Z gas, valves conduit means or the like for admitting compressed buffer gas from the respective source into at least one first portion of the channel whereby the buffer gas flows in the channel toward and away from the gap and the buffer gas which flows toward the gap mixes with high Z gas which normally fills at least a portion of the channel intermediate the gap and the first channel portion, and a suction pump or analogous means for evacuating the mixture of buffer gas and high Z gas from at least one second portion of the channel intermediate the first portion and the interelectrode gap.

The chamber is preferably formed with at least one first orifice which extends transversely (and preferably across at least the major part of the width) of the channel and communicates with the channel as well as with the buffer gas admitting means, and at least one second orifice (which is preferably similar to the first orifice) and communicates with the channel as well as with the evacuating means for the mixture of buffer gas and high Z gas. The pressure of gas in the second portion of the channel is preferably at least slightly less than the pressure of gas in the first portion of the channel.

The novel features which are considered as characteristic of the invention are set forth in particular in the appended claims. The improved imaging chamber itself, however, both as to its construction and the mode of utilizing the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
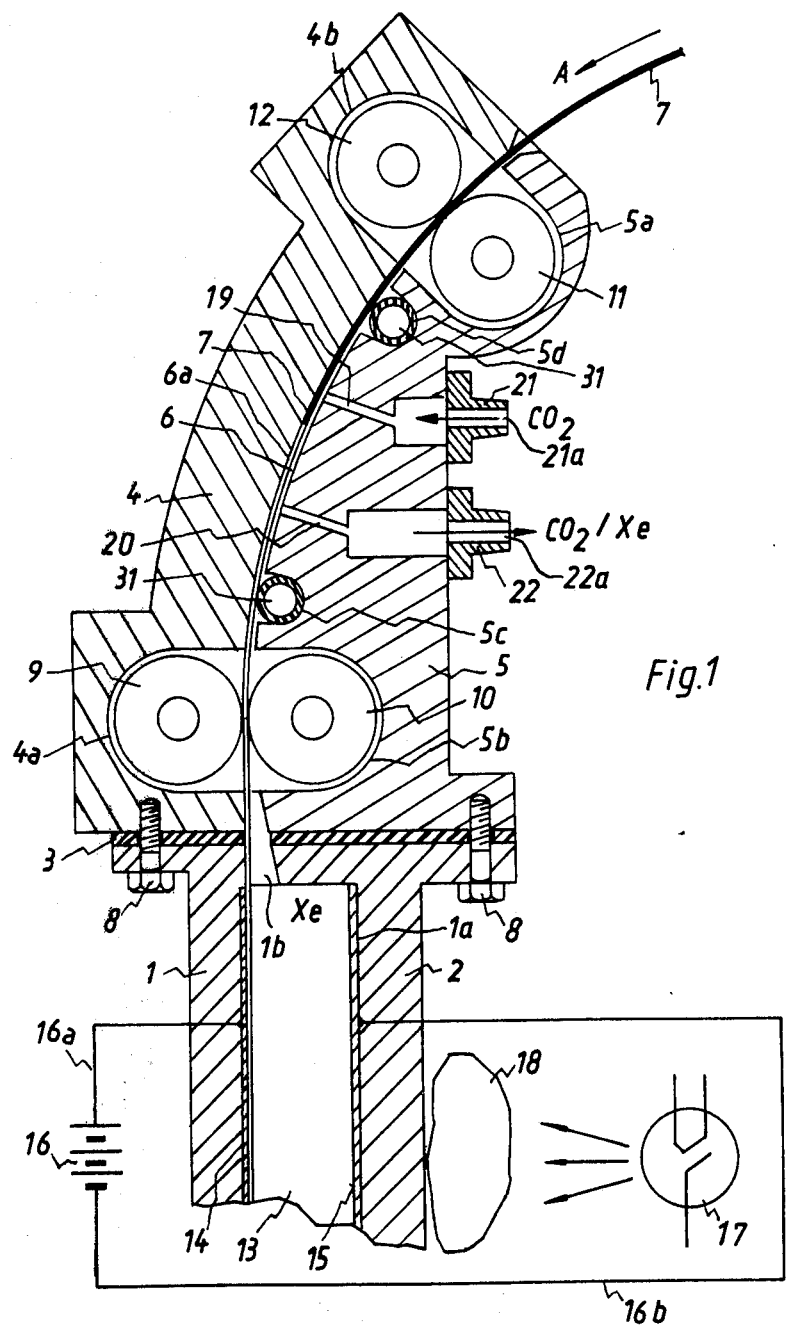
FIG. 1 is a fragmentary partly schematic and partly sectional view of an X-ray apparatus having an ionography imaging chamber which embodies one form of the invention.

FIG. 1 shows a portion of an apparatus for making X-ray images without resorting to X-ray film. The apparatus comprises an ionography imaging chamber having two sections 1 and 2 which define a compartment 1a having an inlet 1b. The compartment 1a receives two spaced-apart electrodes 14, 15 which define an interelectrode gas gap 13. The arrangement of electrodes 14, 15 may be similar to or identical to that of electrodes which are disclosed in the commonly owned copending application Ser. No. 666,410 filed Mar. 12, 1976 by Pfeifer et al. During imaging of an object 18 onto a receptor sheet 7 (which is then located between the electrodes 14 and 15), the gap 13 is filled with a high Z gas (such as Freon or a noble gas, e.g., Krypton or Xenon) which is maintained at an elevated pressure, preferably in the range of 6–20 atmospheres. For example, the receptor sheet 7 can be held in immediate proximity of that side of the electrode 14 which faces the electrode 15. The electrodes 14 and 15 are connected with an external energy source 16 (e.g., 15 kilovolts) by means of conductors 16a and 16b. The source of X-rays is shown at 17. The object 18 is located between the source 17 and the section 2 of the imaging chamber. The potential difference which is applied between the electrodes 14 and 15 accelerates the migration of ions (which develop in the gap 13) toward the receptor sheet 7, and such ions deposit on the exposed surface of the receptor sheet. Ionization develops as a result of penetration of X-rays, which have passed through the object 18, into the gas-filled gap 13. The exposed side of the receptor sheet 7 in the imaging chamber is thus provided with a latent image of the object 18 which modulates the X-rays issuing from the source 17 and penetrating through the section 2 and electrode 15. When the receptor sheet 7 is withdrawn from the imaging chamber, the latent image is developed by resorting to toner particles in a manner not forming part of the invention but well known from the art of xerography.

In accordance with a feature of the invention, the imaging chamber further comprises a gate which includes two sections 4 and 5 defining a preferably arcuate passage 6 in communication with the inlet 1b of the compartment 1a between the chamber sections 1 and 2. The sections 4 and 5 are respectively adjacent to the sections 1 and 2 and are secured thereto by means of screws 8 or analogous fasteners. A suitable sealing element 3 is preferably interposed between the sections 1, 2 on the one hand and the sections 4, 5 on the other hand. The sealing element 3 has an opening in register with the inlet 1b of the compartment 1a.

The direction in which a receptor sheet 7 can be introduced into the passage 6 between the sections 4 and 5 of the gas is indicated by the arrow A. The section 4 is formed with internal cutouts 4b, 4a which are respectively adjacent to the intake and discharge ends of the passage 6 (as considered in the direction of arrow A) and are located opposite similar internal cutouts 5a, 5b of the section 5. The cutouts 5a, 4b respectively receive advancing rolls 11, 12 which can be driven clockwise and counterclockwise, depending upon whether a fresh receptor sheet 7 is to be introduced into the gap 13 (the rolls 11, 12 then respectively rotate counterclockwise and clockwise, as viewed in FIG. 1) or a receptor sheet (which carries a latent image) is to be withdrawn from the imaging chamber (the rolls 11 and 12 then respectively rotate clockwise and counterclockwise). The cutouts 4a, 5b respectively receive advancing rolls 9 and 10. The rolls 9 and 10 are respectively driven in synchronism with and in the same direction as the rolls 12, 11. The rolls 9 to 12 engage the adjacent marginal portions of the receptor sheet 7, i.e., those portions which do not carry a latent image. The outermost parts of such marginal portions extend into and are guided by relatively narrow slits 6a (one shown in FIG. 1) which are defined by the sections 4, 5 of the gate and communicate with the passage 6.

The width of the passage 6 exceeds the thickness of a receptor sheet 7 in order to avoid destruction of the latent image during withdrawal of a sheet from the gap 13. The arrangement is preferably such that the rear (left-hand) side of the sheet 7 can slide along the electrode 14 and along the section 4 but the front (right-hand) side of the sheet 7 (this side carries the latent image) does not contact the electrode 15 and/or the section 5. Consequently, and even though the pressure of high Z gas in the gap 13 is reduced to atmospheric pressure prior to withdrawal of a freshly exposed sheet 7 and until after introduction of the next sheet, relatively large quantities of high Z gas could escape between the sheet 7 and the section 5. During imaging of an object 18 onto the sheet which is located in the gap 13, escape of high Z gas from the imaging chamber is prevented by an inflatable endless flexible seal 31 which is received in a recess 5c, 5d machined into the inner side of the section 5 and which bears against the section 4 when the sheet 7 is properly received in the gap 13; the trailing edge of the sheet is then received in the nip of advancing rolls 9, 10 so that the sheet can be withdrawn by rotating the rolls 9 and 10 in appropriate directions (counterclockwise and clockwise, as viewed in FIG. 1). If the sheet 7 is sufficiently long to extend all the way to and through the nip of the rolls 11, 12 when its front portion is in proper position to receive a latent image, the inflated seal 31 bears against the right-hand side of the sheet between the advancing rolls 9, 10 and 11, 12.

In the absence of any means for preventing the escape or evacuation of high Z gas via passage 6, a relatively large quantity of such gas would be withdrawn by the right-hand side of a freshly exposed sheet 7 in spite of the fact that, during evacuation of sheets, the pressure of gas in the gap 13 equals or closely approximates atmospheric pressure. The high Z gas forms a boundary layer along the image-bearing side of that portion of the sheet 7 which was located in the gap 13 during exposure to X-rays. Inversely, when a fresh sheet 7 is introduced into the gap 13, its sides carry boundary layers consisting of air which, in the absence of any preventive measures, would contaminate the high Z gas in the gap 13 on entry of the fresh sheet into the region between the electrodes 14 and 15. Such contamination would be sufficiently pronounced to warrant complete evacuation of high Z gas from the gap 13 after the making of a relatively small number of consecutive exposures. The presence of a relatively high percentage of air in the gap 13 is highly undesirable because air does not exhibit those properties which are characteristic of high Z gases, namely, highly efficient absorption of X-rays (in order to achieve high sensitivity of the imaging technique) and stopping the primary electrons and creating secondaries (in order to preserve the resolution of the imaging system).

As mentioned hereinabove, high Z gases are expensive; therefore, a high Z gas which has been contaminated by air must be separated from air so that it can be reintroduced into the imaging chamber. The separation is very complex and expensive; as a rule, it necessitates liquefaction of air. Thus, it is highly desirable to reduce or prevent the penetration of air into the gap 13 as well as to reduce or prevent the escape of high Z gas from the gap 13 into the surrounding atmosphere. To this end, the section 5 of the gate is formed with two elongated orifices or ports 19 and 20 which respectively communicate with first and second portions of the passage 6 between the recesses 5c, 5d for the inflatable seal 31 and extend transversely of the passage, preferably all the way between the two slits 6a (i.e., across the entire path for the sheets 7). The orifice 19 communicates with the channel or channels 21a of a nipple 21 which is connected or connectable with a source of a suitable buffer gas by means of flexible hoses or analogous conduits, not shown. The buffer gas is carbon dioxide gas or any other gas which can be readily separated from the high Z gas in a simple, inexpensive and time-saving manner. Furthermore, the buffer gas should be sufficiently inexpensive (i.e., its cost should be a small fraction of the cost of Freon, Krypton or Xenon) so that the cost of X-ray images is not unduly increased even if substantial quantities of buffer gas are permitted to escape into the surrounding atmosphere. Moreover, the buffer gas should not be toxic, corrosive or exhibit other properties which would adversely affect the surrounding atmosphere. It has been found that $CO_2$ gas is eminently suited for use as a buffering medium in an ionography imaging chamber.

The orifice 20 communicates with the channel or channels 22a of a second nipple 22 which is connected to a device for reception of a mixture of buffer gas and high Z gas by means of one or more hoses or other suitable conduits, not shown. The orifices 19 and 20 are disposed at that side of a sheet 7 in the passage 6 which is not in contact with the gate, i.e., which is spaced apart from the section 5. The nipple 21 admits buffer gas at a pressure which preferably slightly exceeds atmospheric pressure (such introduction takes place when the pressure of high Z gas in the gap 13 has been reduced to atmospheric pressure). The buffer gas which issues from the orifice 19 flows in the passage 6 counter to the direction indicated by arrow A to expel air from the passage above the orifice 19. Some buffer gas also flows from the orifice 19 toward the orifice 20 and is mixed with high Z gas in the channel portion between the orifices 19 and 20. Such mixture is evacuated by a suction pump in the conduit means which is connected to the nipple 22. Therefore, the quantity (if any) of buffer gas which reaches the gap 13 is negligible so that the contents of the gap need not be purified at all or the purification must be carried out at infrequent intervals.

The pressure of buffer gas which issues from the orifice 19 is preferably selected in such a way that the inflowing buffer gas forms a turbulent stream which separates the boundary layer from the adjacent side of the receptor sheet 7. The boundary layer is mixed with buffer gas of the turbulent stream and is expelled into the atmosphere by flowing counter to the direction indicated by arrow A.

Suction in the orifice 20 is sufficiently pronounced to insure that the nipple 22 evacuates all such buffer gas which flows from the orifice 19 toward the orifice 20 and also the boundary layer which develops along the right-hand side of the sheet 7 in the passage 6 in the region of the orifice 20. It has been found that the quantity of high Z gas which is evacuated via orifice 20 is relatively small and invariably much less than the quantities of high Z gas which escape into the atmosphere when a freshly exposed receptor sheet is withdrawn from the interelectrode gap of a conventional imaging chamber.

The inflatable seal 31 may constitute a one-piece (endless) O-ring, or it may comprise two or more hoses of finite length each of which is inserted into a separate recess at the inner side of the section 5. The seal 31 is inflated prior to increasing the pressure of high Z gas in the gap 13 and is deflated subsequent to a reduction of gas pressure in the gap to atmospheric pressure. This seal prevents the escape of any high Z gas during the making of latent images in the interelectrode gap.

Figure 2:
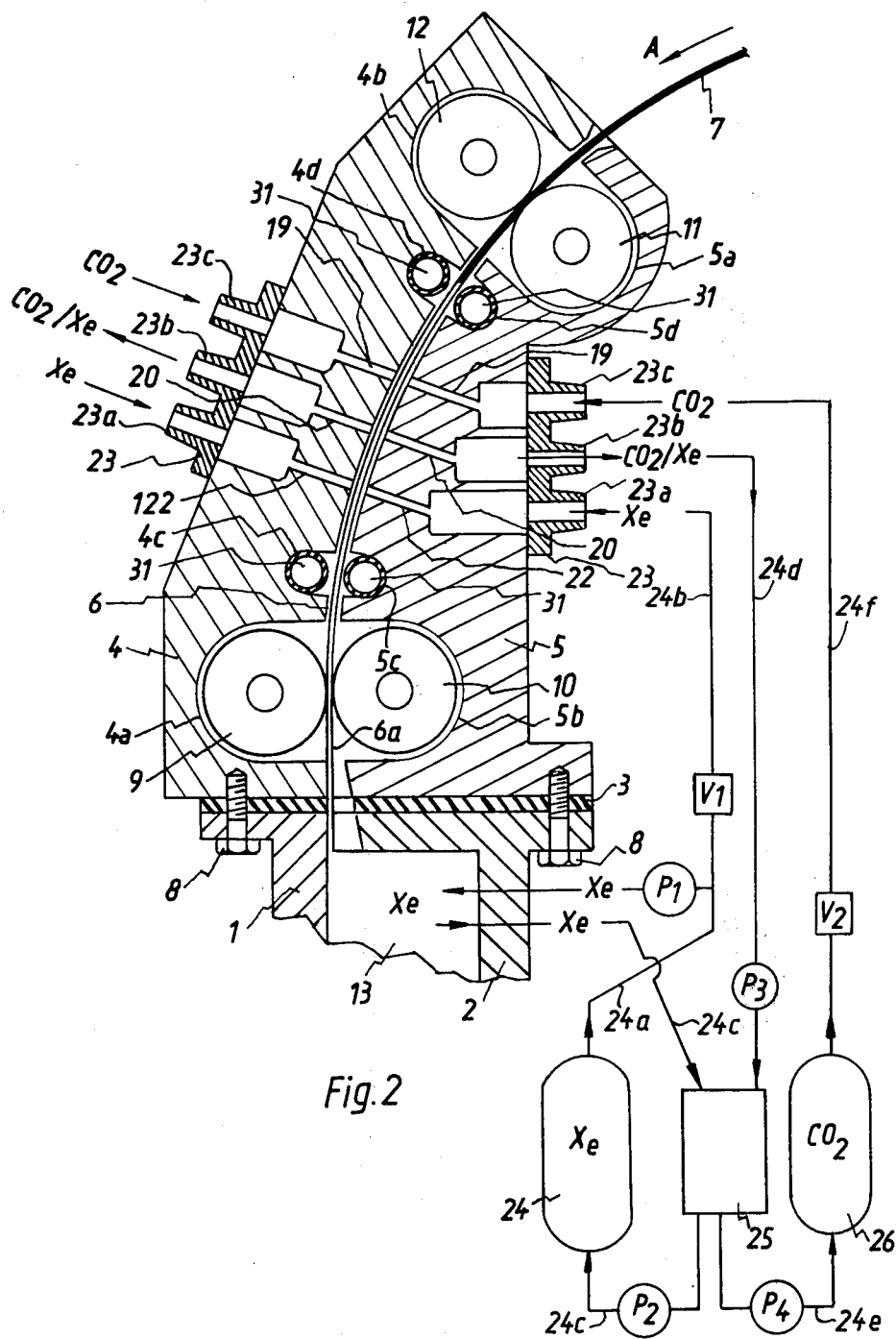
FIG. 2 is a similar fragmentary partly schematic and partly sectional view of an X-ray apparatus having a modified imaging chamber.

FIG. 2 shows an X-ray apparatus with an ionography imaging chamber (see the sections 1, 2) and a gate which constitutes a modification of the gate shown in FIG. 1. All such parts of the second apparatus which are identical with or clearly analogous to corresponding parts of the first apparatus are denoted by similar reference characters.

A difference between the gates of FIGS. 1 and 2 is that a receptor sheet 7 which is caused to move through the passage 6 shown in FIG. 2 is located midway between the sections 4 and 5, i.e., such sheet is out of contact with both sections of the gate. Thus, the slits 6a (only one shown in FIG. 2) are disposed in such a way that they can receive the outermost parts of the respective marginal portions of a receptor sheet which is located midway between the internal surfaces of the sections 4 and 5.

Each of the sections 4 and 5 is formed with an orifice 19 for admission of buffer gas and with an orifice 20 for evacuation of a mixture of buffer gas and high Z gas. The two orifices 19 and the two orifices 20 are respectively located opposite each other. Furthermore, the gate of FIG. 2 comprises inflatable seals 31 at both sides of a receptor sheet 7 in the channel 6. The seal or seals 31 at the right-hand side of the sheet 7 are received in recesses 5c, 5d machined into the internal surface of the section 5, and the seal or seals 31 at the left-hand (rear) side of the sheet 7 are received in recesses 4c, 4d machined into the internal surface of the section 4 opposite the recesses 5c, 5d. The nipples for evacuation of a mixture of high Z gas and buffer gas via orifice 20 are shown at 23b, and the nipples for admission of buffer gas via orifices 19 are shown at 23c. The sections 4 and 5 of the gate are further formed with orifices or ports 122 which are located inwardly of the respective orifices 20 and can receive slightly compressed high Z gas by way of nipples 23a. The admission of at least slightly compressed high Z gas into the channel 6 via orifices 122 during admission of buffer gas via orifices 19 further reduces the likelihood of penetration of buffer gas into the interelectrode gas gap 13. The right-hand nipples 23a–23c may constitute a one-piece body 23 which is secured to the outer side of the section 5. The left-hand nipples 23a–23c constitute a similar one-piece body 23 at the outer side of the section 4.

FIG. 2 further shows the system of pumps and reservoirs for high Z gas and buffer gas. A reservoir or vessel containing a supply of purified high Z gas (e.g., Xenon) is shown at 24. The conduit 24a between this vessel and the interelectrode gap 13 contains a high-pressure pump P1 which can cause the gap 13 to be filled with high Z gas at a selected pressure (preferably within the aforementioned range of 6–20 atmospheres). The output of the vessel 24 is further connected with the nipples 23a by way of conduits 24b (only one shown) containing one or more valves V1 which can be opened to insure that the orifices 122 can admit slightly compressed high Z gas into that portion of the channel 6 which is located between the orifices 20 and the gap 13. When the making of a latent image is completed, the high Z gas which is confined in the gap 13 is returned into the vessel 24 by way of a conduit 24c which contains a suitable device 25 (e.g., a molecular sieve or filter) for separation of buffer gas from high Z gas and a low-pressure pump P which draws purified high Z gas from the device 25 and forces it into the vessel 24. The pressure of high Z gas in the vessel 24 subsequent to evacuation of compressed gas from the gap 13 exceeds atmospheric pressure and is sufficient to insure that the gas flows from the outlet of the vessel 24 into the nipples 23a as soon as the valve V1 opens. This valve is opened upon completion of evacuation of high Z gas from the gap 13 (i.e., when the pressure of high Z gas in the gap 13 equals or approximates atmospheric pressure). The valve V1 is preferably designed to allow for regulation of pressure of the gas stream which flows in the conduit 24b toward the nipples 23a.

The device 25 has two inlets for mixtures of high Z gas and buffer gas, an outlet for purified high Z gas, and an outlet for buffer gas.

Conduits 24d connect the nipples 23b with the right-hand inlet of the separating device 25 and contain a suction pump P3 which evacuates a mixture of buffer gas and high Z gas from the channel 6 intermediate the orifices 19 and 122. The mixture which enters the device 25 via the right-hand inlet contains a much higher percentage of buffer gas than the fluid which enters the device 25 via the left-hand inlet. A reservoir 26 for buffer gas is connected with the right-hand (buffer gas) outlet of the separating device 25 by a conduit 24e which contains a low-pressure pump P4 for introduction of separated buffer gas into the reservoir 26. The outlet of the reservoir 26 for buffer gas is connected with the nipples 23c by conduit means 24f containing adjustable regulating valve means V2 for admission of buffer gas into the orifices 19. The pressure of buffer gas in the reservoir 26 preferably exceeds atmospheric pressure.

Figure 3:
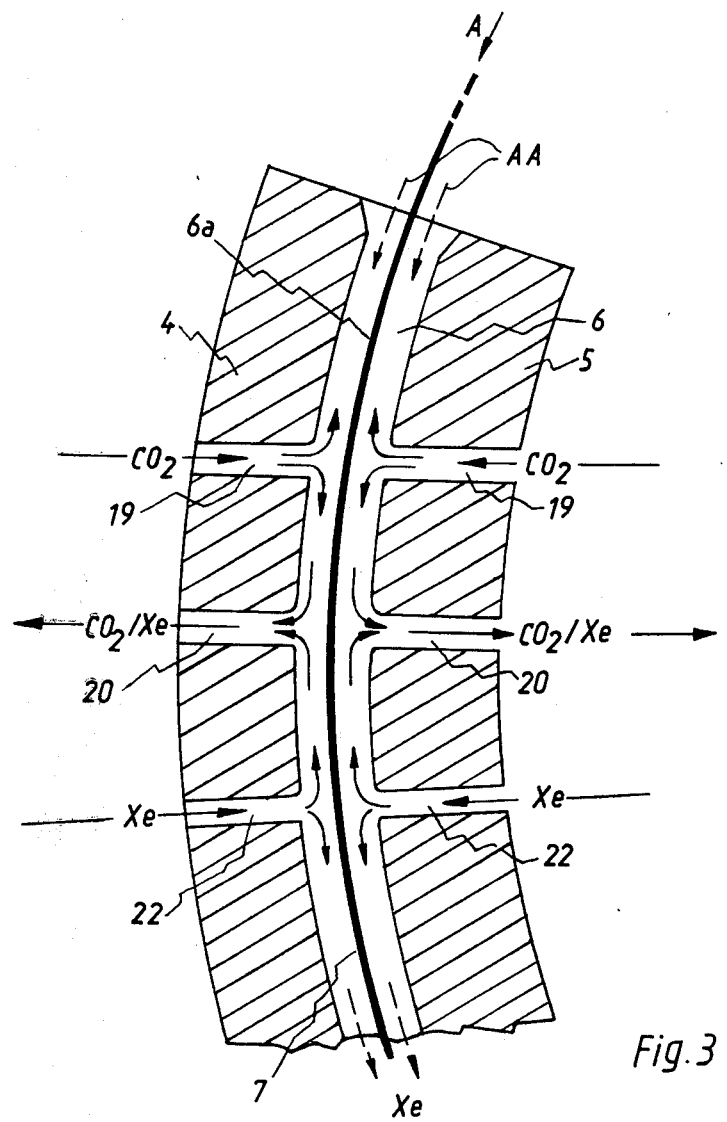
FIG. 3 is an enlarged view of a detail in the imaging chamber of FIG. 2.

FIG. 3 shows, on a larger scale, the flow of air, buffer gas, high Z gas and a mixture of buffer gas and high Z gas in the channel 6 during introduction of a fresh receptor sheet 7 into the interelectrode gap 13 (not shown in FIG. 3). It will be seen that the buffer gas (e.g., $CO_2$ gas) prevents entry of atmospheric air (arrows AA) into the interelectrode gap because the pressure of buffer gas in the orifices 19 exceeds atmospheric pressure. Such gas flows in the channel 6 to both sides of the respective orifices 19 and expels air from the channel 6 upstream of the orifices 19. The orifices 20 evacuate a mixture of buffer gas and high Z gas, and the orifices 122 admit high Z gas which flows toward the interelectrode gap as well as toward the orifices 20. The gas which flows from the orifices 122 toward the interelectrode gap (downwardly, as viewed in FIG. 3) is practically pure high Z gas so that the contamination of gas in the interelectrode gap is eliminated altogether or is reduced to a fraction of contamination of high Z gas in the interelectrode gap of a conventional ionography imaging chamber.

An important advantage of the improved X-ray apparatus is that the quantities of other than high Z gas which enter the interelectrode gap 13 constitute a fraction of quantities of air which enter the interelectrode gap of a conventional ionography imaging chamber. Moreover, the gas which enters the interelectrode gap to be mixed with high Z gas is not air but rather a gas whose chemical and physical properties are such that it can be separated from high Z gas at a fraction of the cost of separating high Z gas from atmospheric air. Therefore, the provision of separating device 25 contributes very little to the initial and operating cost of the improved apparatus; this device serves primarily for separation of buffer gas from the mixture which is evacuated from the channel 6 via orifice or orifices 20. Buffer gas might enter the interelectrode gap if the pressure of gas in the orifice or orifices 19 is excessive (especially in the embodiment of FIG. 1) or if the pressure of buffer gas in the orifices 19 greatly exceeds the pressure of high Z gas in the orifices 122 of FIGS. 2 and 3.

The width of the orifices 122 preferably equals the width of the orifices 19 and 20, i.e., the orifices 122 also extend across the entire path for movement of receptor sheets 7 into and from the interelectrode gap. The provision of orifices 122 further reduces the likelihood of penetration of appreciable quantities of buffer gas into the space between the electrodes 14 and 15 of the imaging chamber. The pressure of high Z gas in the orifices 122 is preferably such that the high Z gas which enters the channel 6 forms a turbulent stream which separates the boundary layers from the respective sides of the sheet 7 in the adjacent portion of the channel.

The provision of several spaced-apart pairs of advancing rolls in the gate is advantageous and desirable because the orifices 19, 20 or 19, 20, 122 can be disposed between a first and a second pair of advancing rolls. The length of the channel 6 between such pairs of advancing rolls is sufficient to insure that the buffer gas which enters the channel via orifice or orifices 19 can effectively expel air counter to the direction indicated by arrow A and that there is ample room for evacuation of a mixture of buffer gas and high Z gas intermediate the orifice or orifices 19 and the interelectrode gap 13 in a region located sufficiently upstream of the inlet 1b to prevent the penetration of excessive quantities of buffer gas into the compartment 1a. The provision of an arcuate channel 6 is desirable because a sheet 7 which is curved during introduction into or withdrawal from the gap 13 by way of the channel 6 is relatively stiff, i.e., it is less likely to flutter as a result of impingement of gas streams against the one and/or the other side thereof. Moreover, and if the orifices are located only at one side of the channel 6, the rear side of the sheet 7 is more likely to lie flat against the concave internal surface of the section 4 during movement of the sheet toward or out of the compartment 1a.

The improved apparatus is susceptible of many further modifications without departing from the spirit of the invention. For example, the gate of FIG. 1 may also comprise an orifice 122 for admission of compressed high Z gas against the concave side of a receptor sheet 7 in the passage 6 between the orifice 20 and the gap 13. Furthermore, the orifices 122 of FIGS. 2 and 3 can receive high Z gas from a separate source, and the gate may be assembled of three or more sections.

Apart of this it would of course be possible to substitute $CO_2$ gas as buffer gas by any other gas which is easily separable from the high Z gas. For instance, if Xenon or Krypton are used as high Z gas, Freon could be used as buffer gas.

Without further analysis, the foregoing will so fully reveal the gist of the present invention that others can, by applying current knowledge, readily adapt it for various applications that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. In an X-ray apparatus, a combination comprising an ionography imaging chamber defining an interelectrode gap and having a channel for introduction of insulating charge-receiving media into and for withdrawal of such media from said gap; a source of high Z gas; means for conveying compressed high Z gas from said source into said gap and vice versa; a source of compressed buffer gas which is readily separable from said high Z gas; means for admitting compressed buffer gas from the respective source into at least one first portion of said channel whereby the buffer gas flows in said channel toward and away from said gap and the buffer gas flowing toward said gap mixes with high Z gas which normally fills at least a portion of said channel intermediate said gap and said first portion of said channel; and means for evacuating the mixture of buffer gas and high Z gas from at least one second portion of said channel intermediate said gap and said first portion of said channel, said evacuating means comprising a device for maintaining the gases in said second portion of said channel at a pressure which is less than the pressure of buffer gas in said first portion of said channel.

2. A combination as defined in claim 1, wherein said chamber has at least one first orifice extending transversely of said channel in the region of said first portion of said channel and communicating with said channel and said gas admitting means, and at least one second orifice extending transversely of said channel in the region of said second portion of said channel and communicating with said channel and said evacuating means.

3. A combination as defined in claim 2, wherein said media are receptor sheets having a predetermined width and the width of said channel at least equals said predetermined width, each of said orifices extending across at least the major portion of said channel.

4. A combination as defined in claim 1, further comprising means for separating buffer gas from the mixture which is evacuated from said second portion of said channel.

5. A combination as defined in claim 1, wherein said buffer gas is carbon dioxide gas.

6. A combination as defined in claim 1, further comprising means for admitting compressed high Z gas into at least one third portion of said channel intermediate said gap and said second portion of said channel.

7. A combination as defined in claim 6, wherein said last mentioned admitting means is connected with said first mentioned source.

8. A combination as defined in claim 6, wherein said last mentioned admitting means comprises means for maintaining the high Z gas in said third portion of said channel at an elevated pressure at which such gas forms a turbulent stream along the adjacent side of an insulating medium in said channel.

9. A combination as defined in claim 1, wherein said chamber has a first group of interconnected sections which define said gap and a second group of interconnected sections which are secured to the sections of said first group and define said channel.

10. A combination as defined in claim 1, wherein said channel has a first end which communicates with the atmosphere and a second end which communicates with said gap, and further communicates with said gap, and further comprising inflatable sealing means disposed in said chamber, at least at one side of said channel, to seal said gap from the first end of said channel while an insulating medium in said gap receives a charge.

11. A combination as defined in claim 1, wherein said channel has a first end in communication with the atmosphere and a second end in communication with said gap, and further comprising first and second advancing means for insulating media in said channel, said first advancing means being mounted in said chamber nearer to said first end and said second advancing means being mounted in said chamber nearer to said second of said channel.

12. A combination as defined in claim 11, wherein each of said advancing means comprises a pair of rolls disposed at the opposite sides of said channel and said first and second portions of said channel are located intermediate said first and second advancing means.

13. A combination as defined in claim 1, wherein said channel has an arcuate shape so that a sheet-like medium in said channel has a convex side and a concave side.

14. In an X-ray apparatus, a combination comprising an ionography imaging chamber defining an interelectrode gap and having a channel for introduction of insulating charge-receiving media into and for withdrawal of such media from said gap; a source of high Z gas; means for conveying compressed high Z gas from said source into said gap and vice versa; a source of compressed buffer gas which is readily separable from said high Z gas; means for admitting compressed buffer gas from the respective source into at least one first portion of said channel whereby the buffer gas flows in said channel toward and away from said gap and the buffer gas flowing toward said gap mixes with high Z gas which normally fills at least a portion of said channel intermediate said gap and said first portion of said channel, said admitting means comprising means for maintaining the buffer gas in said first portion of said channel at an elevated pressure at which the buffer gas in said first portion of said channel forms a turbulent stream along the adjacent side of an insulating medium in said channel; and means for evacuating the mixture of buffer gas and high Z gas from at least one second portion of said channel intermediate said gap and said first portion of said channel.

* * * * *

UNITED STATES PATENT AND TRADEMARK OFFICE
CERTIFICATE OF CORRECTION

PATENT NO. : 4,074,133

DATED : February 14, 1978

INVENTOR(S) : Jurgen Muller, Alfred Rheude & Manfred Schmidt

It is certified that error appears in the above-identified patent and that said Letters Patent are hereby corrected as shown below:

Col. 7, line 17, "output" should read --outlet--;
Col. 10, claim 10, line 22, the following words should be deleted: "and further communicates with said gap";
Col. 10, claim 11, line 34, the word --end-- should be inserted after the word "second".

Signed and Sealed this

Twenty-seventh Day of November 1979

[SEAL]

Attest:

RUTH C. MASON
Attesting Officer

LUTRELLE F. PARKER
Acting Commissioner of Patents and Trademarks